United States Patent [19]

Essex

[11] Patent Number: 4,735,171
[45] Date of Patent: Apr. 5, 1988

[54] ANIMAL FEEDING APPARATUS

[76] Inventor: James O. Essex, 20520 E. Fuero Dr., Walnut, Calif. 91789

[21] Appl. No.: 347,012

[22] Filed: Feb. 8, 1982

[51] Int. Cl.⁴ .............................................. A01K 5/02
[52] U.S. Cl. ................................ 119/51.12; 119/51.5; 119/56 R
[58] Field of Search ............... 119/51.11, 51.12, 51.13, 119/51.5, 56 R, 74, 78; 222/77, 367, 370

[56] References Cited

U.S. PATENT DOCUMENTS

| | | | |
|---|---|---|---|
| 407,455 | 7/1889 | Smith | 119/56 R |
| 3,196,835 | 7/1965 | Bergevin | 119/51.5 X |
| 3,962,997 | 6/1976 | Ruth | 119/51.11 |
| 4,000,719 | 1/1977 | Richards | 119/51.5 X |
| 4,079,699 | 3/1978 | Longmore et al. | 119/51.11 |
| 4,256,054 | 3/1981 | Hitchcock | 119/56 R X |

Primary Examiner—Robert P. Swiatek
Attorney, Agent, or Firm—Boniard I. Brown

[57] ABSTRACT

Feeding apparatus which includes a feeding dish dimensioned for receiving a predetermined single food portion and structure for receiving a quantity of food which is at least as great in quantity as a plurality of food portions and structure for delivering a single predetermined portion from the structure for receiving into the feeding dish. The structure for delivering includes structure for sensing the weight of the feeding dish and the associated food disposed therein and a timing mechanism. The structure for delivering operates when the feeding dish is substantially empty and in addition a predetermined interval has elapsed.

10 Claims, 2 Drawing Sheets

ANIMAL FEEDING APPARATUS

BACKGROUND OF THE INVENTION

The invention relates to animal feeding apparatus and particularly to apparatus for delivering a predetermined quantity of food at a predetermined time. The owners of animals are often constrained in their travel plans and other activities by the feeding schedules of their pets. It is of great importance for many people to be able to vary their personal schedules without altering the feeding schedule for their animals. The use of a standardized feeding cycle, such as one feeding per day at a given time, is desirable because of the natural rhythm of many animals as well as the desirability of humane treatment of animals.

The utilization of such feeders for dogs, for example, has the advantage of eliminating the requirement for a boarding kennel. The dog will be happier in a more familiar environment and may also function as a watchdog. The invention has primary application to the feeding of cats and dogs and other domestic animals, although it will be understood that it also has application to feeding farm and other animals.

It is an object of the invention to provide apparatus which facilitates the rapid adjustment of a quantity of food in an individual portion without the necessity for using any tools to make the adjustment.

Another object is to deliver both water and other feed material concurrently.

It is another object of the invention to provide means for agitating a fluent food material which is being dispensed to avoid caking or other undesired lodging of the fluent material.

Still another object of the invention is to provide apparatus which may be constructed in large part from off the shelf apparatus.

SUMMARY OF THE INVENTION

The foregoing objects and other objects and advantages which shall become apparent from the detailed description of the preferred embodiment are attained in an apparatus which includes feeding apparatus which includes a feeding dish dimensioned for receiving an associated predetermined single food portion and means for receiving a quantity of food which is at least as great in quantity as a plurality of food portions. The apparatus also includes means for delivering a single predetermined portion from the means for receiving into the feeding dish which includes means for sensing the weight of the feeding dish and the associated food disposed therein and a timing mechanism. The means for delivering operates when the feeding dish is substantially empty and, in addition, a predetermined interval has elapsed.

The means for delivering may include a timer and may have a first pair of electrical contacts which are closed for a first predetermined time, after the elapse of a second predetermined time period. The means for delivering may include means for sensing when the feeding dish is substantially empty. The means for sensing may include a lever having a pivot point intermediate (a) an electrical contact and (b) an axial portion supporting the feeding dish. The apparatus may also include latching means for latching the contact on the lever in a closed or contacting position during the first predetermined period and the feeding dish is substantially empty. The latching means may include a solenoid coil. The means for delivering may include an auger. The apparatus may include first and second liquid reservoirs and the second liquid reservoir may include thermostatic heating means and liquid lever flow control means for maintaining sufficient flow from the first reservoir to maintain a predetermined level in the second reservoir. A third reservoir means may have liquid level flow control means for maintaining a predetermined level in the third reservoir. The third reservoir may be an open reservoir for drinking water for an animal and the first reservoir may surround the means for receiving.

BRIEF DESCRIPTION OF THE ACCOMPANYING DRAWING

DESCRIPTION OF THE PREFERRED EMBODIMENT

Figure 1:
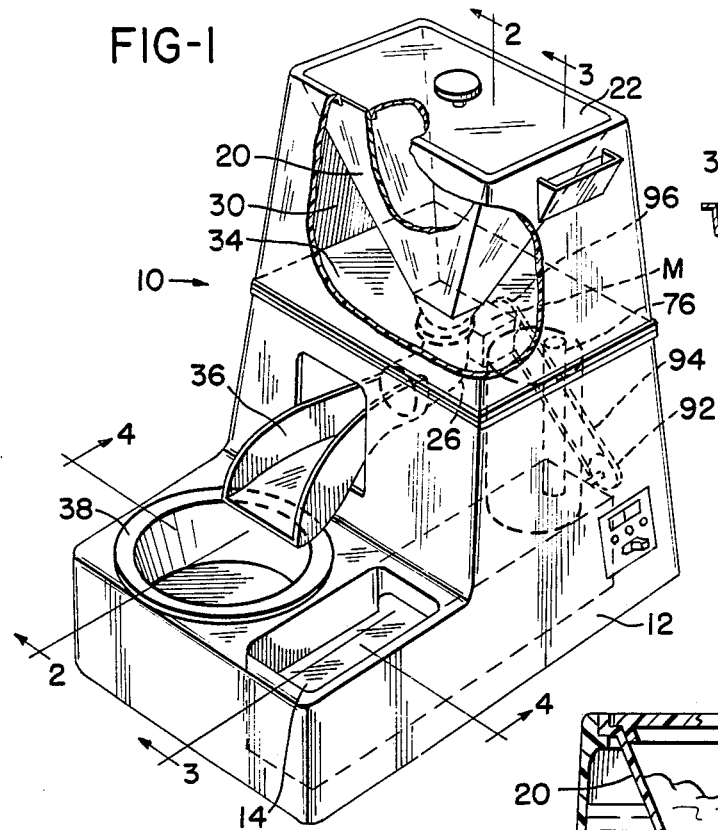
FIG. 1 is a perspective view of one form of the apparatus in accordance with the invention.

Referring now to FIGS. 1–4, there is shown a feeding apparatus 10 in accordance with the invention. The feeding apparatus 10 includes a housing 12 having an integrally molded water trough 14. An access door 13 is disposed in a sidewall of the housing 12. The housing 12 is generally step shaped and the water trough 14 is disposed along a generally horizontal surface which is adjacent to an upstanding portion, which is used to contain reservoirs for water and a food hopper or receiving means 20. The upper face of the housing 12 is generally horizontal and is closed by a cover 22. A food hopper or receiving means 20 is disposed beneath the cover 22 and is tapered from the open end thereof, adjacent to the cover 22, to a narrow portion which is coupled to an elbow 26, through which an auger 28 extends. The auger 28 is dimensioned and configured such that the outside diameter thereof is substantially the same as the inside diameter of the elbow 26.

Disposed about the food hopper or receiving means 20 is a storage reservoir 30. The storage reservoir 30 is in fluid communication with a Y-shaped fluid coupling 32. A generally horizontal, generally planar dividing member 34 is the lower limit of the storage reservoir 30. The generally horizontal, generally planar dividing member 34 is sealed around the lower extremity of the food hopper or receiving means 20 in fluid tight relationship. A warm water reservoir 33 is supplied via a branch of the Y-shaped fluid coupling 32, and a float valve 35 controls water flow to this reservoir from storage reservoir 30.

Disposed immediately below the lower extremity of the elbow 26 is a first end of a delivery chute 36, which has the other end thereof disposed over a food dish 38. The food dish 38 is a discrete element which extends through a circular opening 40, which is dimensioned to allow free vertical movement of the food dish 38.

The food dish 38 is secured by a rivet or threaded fastening member 41 to one end of a lever 42. The lever 42 is supported by a pivot 44 disposed near the midpoint of the lever 42. At the other axial extremity of the lever 42 there is located a first contact 46 and a stop member or core 48. Cooperating with the stop member or core 48 is an electromagnet and weight assembly 50. The first contact 46 and the stop member or core 48 are disposed respectively for engagement with a second contact 52 and a stop member 54.

Figure 5:
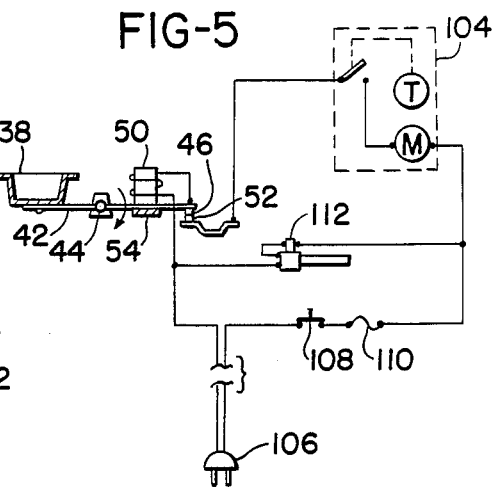
FIG. 5 is a schematic view illustrating the electrical wiring in accordance with the apparatus of FIG. 1.
Figure 2:
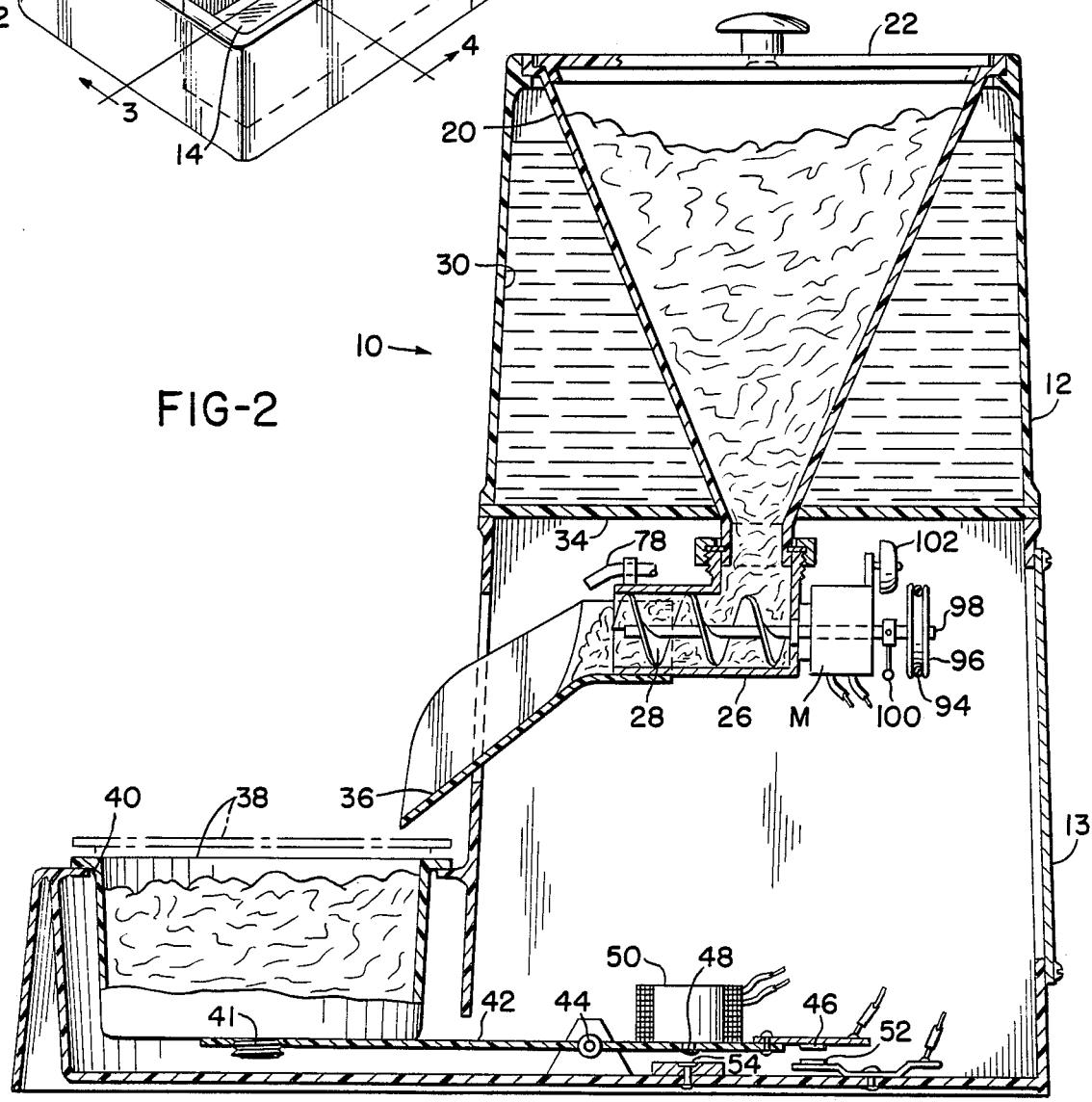
FIG. 2 is a sectional view taken along the line 2—2 of FIG. 1.
Figure 3:
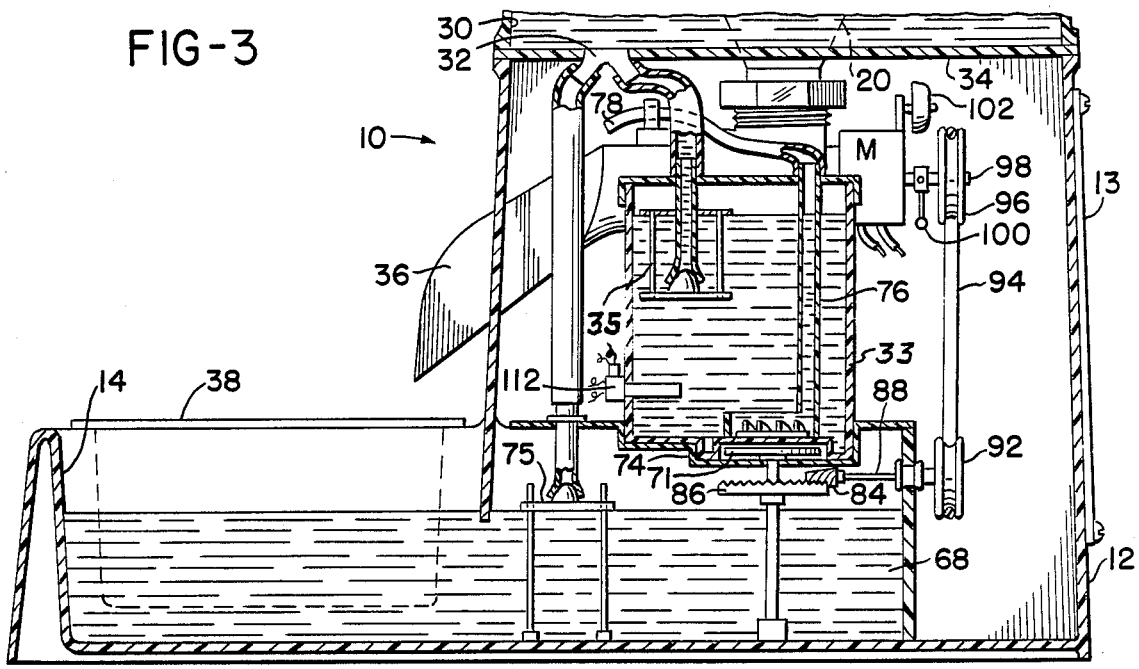
FIG. 3 is a sectional view taken along the line 3—3 of FIG. 1.
Figure 4:
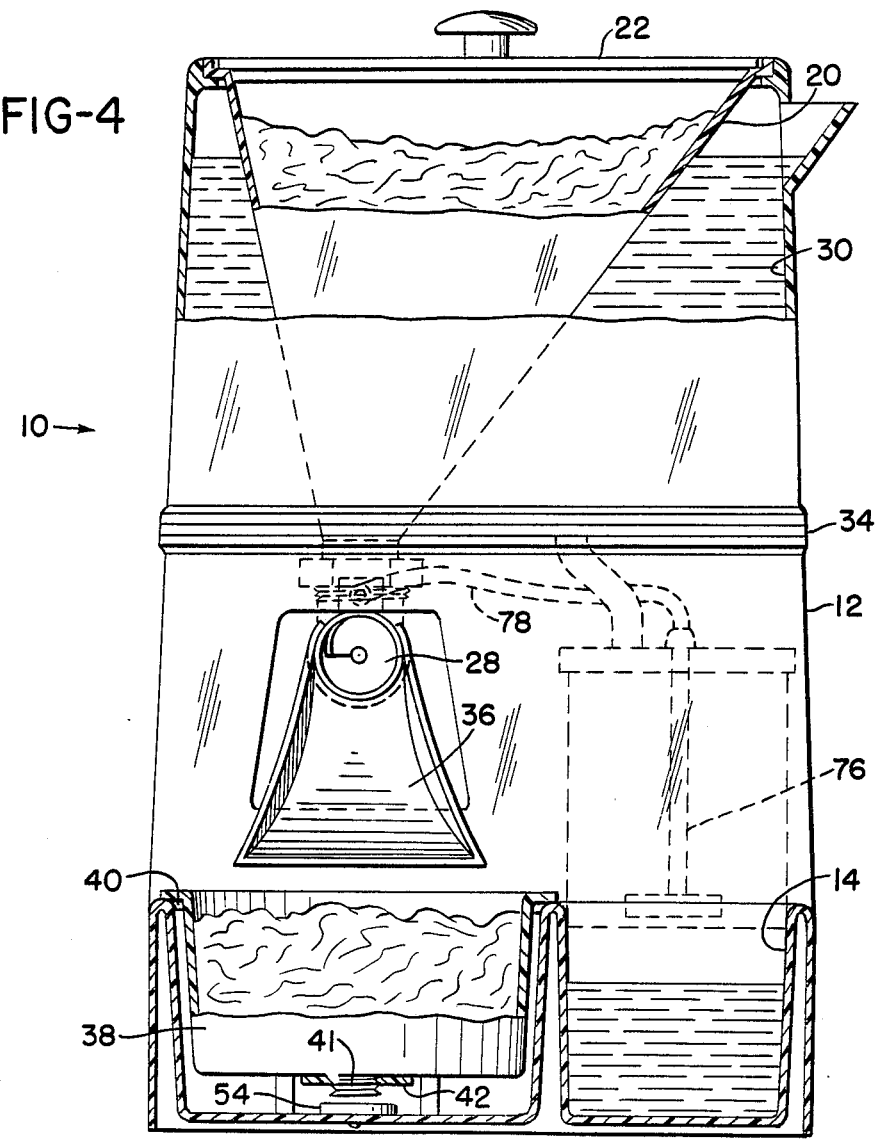
FIG. 4 is a sectional view taken along the line 4—4 of FIG. 1.

As best seen in FIG. 5, a timer mechanism 104 includes a motor, which drives a switching mechanism identified by the letter T, which enables the user to adjsut the time at which an integral switch will close and will preferably also allow adjustment of the duration during which the integral switch is closed. Ordinarily the timer mechanism 104 will allow setting of a period of at least twenty four hours. In some forms of the invention, digital settings with solid state circuitry using quartz or other crystals will be utilized and the apparatus will enable the user to set the day, as well as the time and the period during which the integral switch is closed. The circuitry also includes a plug 106 for connection to a conventional power supply such as 110 volts, 60 Hertz. A master power switch 108 is connected in series with a fuse 110. Closure of the switch 108 will immediately apply power to the heater and thermal switch assembly 112, which will heat the water in the warm water reservoir 33 to a predetermined setting. When the food dish 38 is substantially empty the lever 42 will rotate about the pivot 44 causing the first contact 46 and the second contact 52 to close and complete a circuit to drive the motor M and thus drive the auger 28 for a second predetermined period ot thus control the quantity of food that is delivered. As shown in FIG. 3, a pump impeller is disposed within a scroll 74. A float valve 75 controls water passage via a branch of coupling 32 to the drinking water reservoir 68 from the storage reservoir 30.

The timer T is provided with power (by means not shown in the circuit diagram) whenever the switch 108 is closed. As best seen in FIG. 3, the timer mechanism 104 may include a striker 100, mounted on the shaft 98, which cooperates with a bell 102. The bell 102 has the function of signaling to the dog or other animal that a meal is being served. In the event that the food dish 38 is full, the first contact 46 and the second contact 52 will be separated, and hence power will never be applied to the motor M which drives the auger 28. It will be seen that the motor M is secured by means (not shown) to prevent rotation when a torque is applied to the shaft 98. When the motor M is energized, the shaft 98 is rotated and accordingly via the pulley 96, the belt 94, the pulley 92, the shaft 88 and bevel gears 84, 86 rotate the magnet 71 to rotate the impeller to force water out of the conduit 76 and hose 78 into the delivery chute 36, where it will mix with the food that is delivered from the food hopper or receiving means 20 by the auger 28.

The pulley belt 94 may be manually disengaged from the pulleys, thus to render impeller 72 inoperative so that only food is supplied via the chute 36 to the food dish 38, without water.

It will be understood that the electromagnet and weight assembly 50 has the function of holding the stop members 48 and 54 together and hence the contacts 46 and 52 together as long as the contacts in the timer mechanism 104 are closed. When the dish 38 is full, the contacts 46, 52 will separate and the power to the motor M will be interrupted. This interruption may be a function of the weight of the feed dish 38 and/or the time interval during which the auger 28 is driven.

Advantageously the apparatus, in accordance with the invention, mixes the heated water with the food so that essentially a hot meal is prepared for the animal at a predetermined time. The ability to set the time period during which the motor of the timer mechanism 104 operates insuring that the precisely desired amount of food is delivered to the food dish 38.

It will be understood that reference has been made herein to a timer which is set to actuate after a predetermined time interval. It will be understood that in many cases the predetermined time interval will be determined by setting a specific future time at which the event is to occur instead of merely setting a finite number of hours and minutes. Thus, the two shall be considered to be equivalent for the purposes of this application.

An alternative to the switching and relay circuits illustrated is a digital circuitry embodiment. More precisely the circuit may utilize an and gate which will provide a high or positive signal whenever a microswitch senses a feeding dish 38 is empty and also the switch in the timer mechanism 104 is closed. The timing mechanism may alternatively be a quartz crystal device and in some embodiments of the invention a microprocessor chip may be used with appropriate programming to accomplish the same results.

The invention has been described with reference to its illustrated preferred embodiment. Persons skilled in the art of constructing feeding apparatus may, upon exposure to the teachings herein, conceive variations in the mechanical development of the components therein. Such variations are deemed to be encompassed by the disclosure, the invention being delimited only by the appended claims.

The inventor claims:

1. Feeding apparatus which comprises:
   a feeding dish dimensioned for receiving an associated predetermined single food portion;
   means for receiving a quantity of food which is at least as great in quantity as a plurality of food portions; and
   means for delivering a single predetermined portion from said means for receiving into said feeding dish, said means for delivering including means for sensing the weight of said feeding dish and the associated food disposed therein and a timing mechanism, said means for delivering operating when said feeding dish is substantially empty and in addition a predetermined interval has elapsed.

2. Feeding apparatus which comprises:
   a feeding dish dimensioned for receiving an associated predetermined single food portion;
   means for receiving a quantity of food which is at least as great in quantity as a plurality of food portions; and
   means for delivering a single predetermined portion from said means for receiving into said feeding dish, said means for delivering including means for sensing the weight of said feeding dish and the associated food disposed therein and a timing mechanism, said means for delivering operating when said feeding dish is substantially empty and in addition a predetermined interval has elapsed;
   said means for delivering including a timer and has a first pair of electrical contacts which are closed for a first predetermined time, after the elapse of a second predetermined time period.

3. The apparatus as described in claim 2, wherein:

said means for delivering includes means for sensing when said feeding dish is substantially empty.

4. The apparatus as described in claim 3, wherein:
said means for sensing includes a lever having a pivot point intermediate (a) an electrical contact and (b) an axial portion supporting said feeding dish.

5. The apparatus as described in claim 4, further including:
latching means for latching said contact on said lever in the closed position during said first predetermined period when said feeding dish is substantially empty.

6. The apparatus as described in claim 5, wherein:
said latching means includes a solenoid coil.

7. Feeding apparatus which comprises:
a feeding dish dimensioned for receiving an associated predetermined single food portion;
means for receiving a quantity of food which is at least as great in quantity as a plurality of food portions; and
means for delivering a single predetermined portion from said means for receiving into said feeding dish, said means for delivering including means for sensing the weight of said feeding dish and the associated food disposed therein and a timing mechanism, said means for delivering operating when said feeding dish is substantially empty and in addition a predetermined interval has elapsed;
said means for delivering including an auger.

8. The apparatus as described in claim 7, further including:
first and second liquid reservoirs, said second liquid reservoir including thermostatic heating means and liquid level flow control means for maintaining sufficient flow from said first reservoir to maintain a predetermined level in said second reservoir.

9. The apparatus as described in claim 8, further including:
a third reservoir means having liquid level flow control means for maintaining a predetermined level in said third reservoir, said third reservoir being an open reservoir for drinking water for an animal.

10. The apparatus as described in claim 9, wherein:
said first reservoir surrounds said means for receiving.

* * * * *